DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 367

T879,012

IODIDE-CONTAINING PHOTOSENSITIVE MATERIALS

James G. McNally, Jr., and William C. Gray, both % Kodak Park Works, Rochester, N.Y. 14650

Filed May 6, 1970, Ser. No. 35,291

Int. Cl. G03c *5/24*

U.S. Cl. 96—48

No Drawing. 25 Pages Specification

Novel photosensitive elements, compositions and processes are described. The described photosensitive materials contain an iodide and comprise (a) a colorless material capable of combining with iodine to form a colorant such as starch, baryta, agar-agar, polyvinylacetate, polyvinyl alcohol or divinyl formal, and (b) a photo-oxidant such as compounds containing a heterocyclic nitrogen atom which is substituted by an alkoxy or an acyloxy group such as N-ethoxy-2-picolinium iodide, or a benzene diazonium salt such as 4-diethylaminobenzenediazonium zinc chloride. When the photooxidants are exposed to actinic radiation, photolytic products are formed which cause oxidation of the iodide ion to molecular iodine, which in turn combines with the colorless material to form a colored material in the areas of exposure. The iodide ion can be a separate iodide salt such as potassium iodide or cuprous iodide as well as being an anion for the photo-oxidant.